Figure 1:
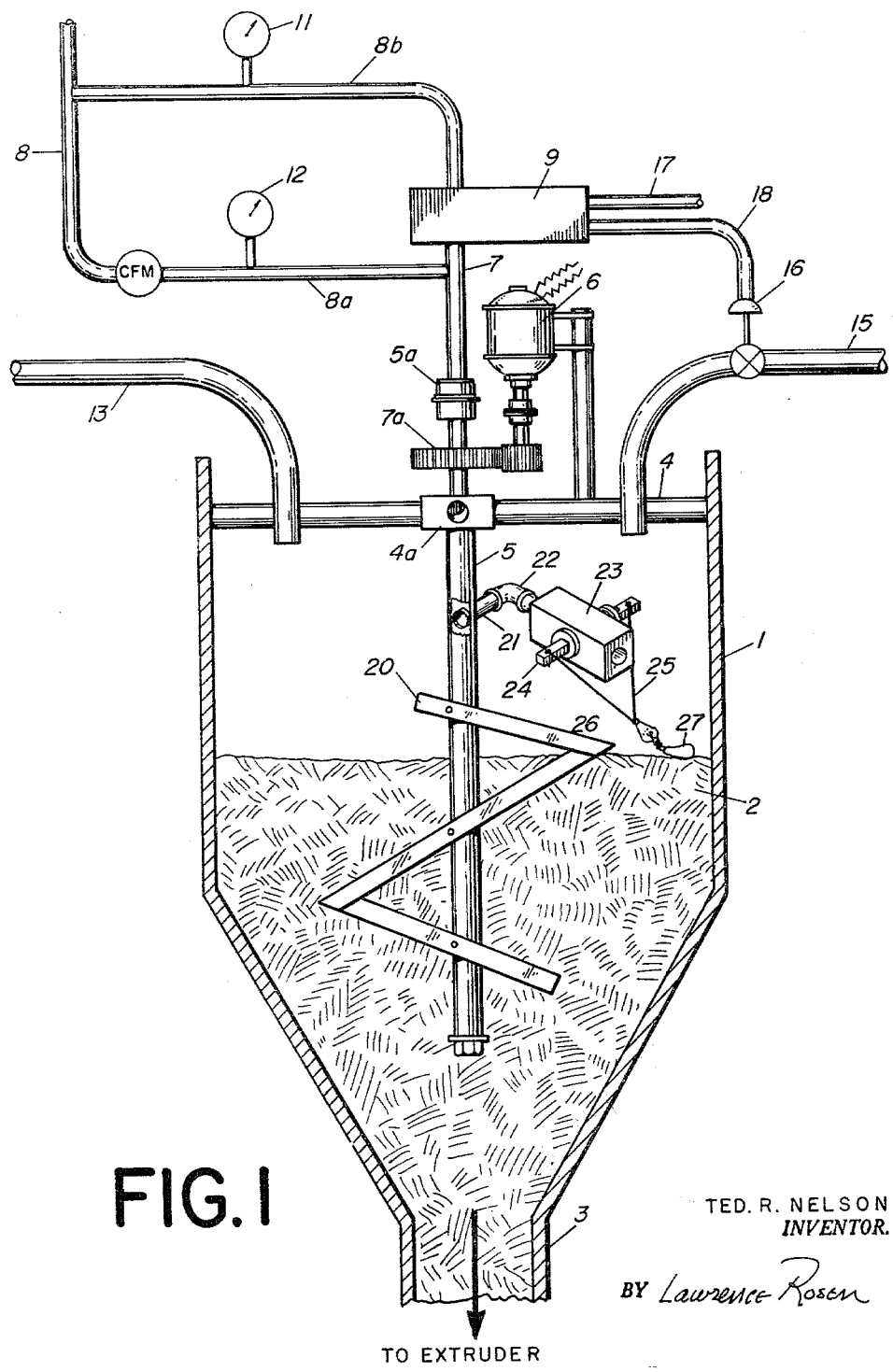

March 23, 1965

T. R. NELSON 3,174,648

DEVICE FOR INDICATING AND CONTROLLING LEVELS OF VARIABLE
BULK DENSITY SOLIDS MIXTURES

Filed Nov. 1, 1962

2 Sheets-Sheet 1

TO EXTRUDER

TED. R. NELSON
*INVENTOR.*

BY Lawrence Rosen

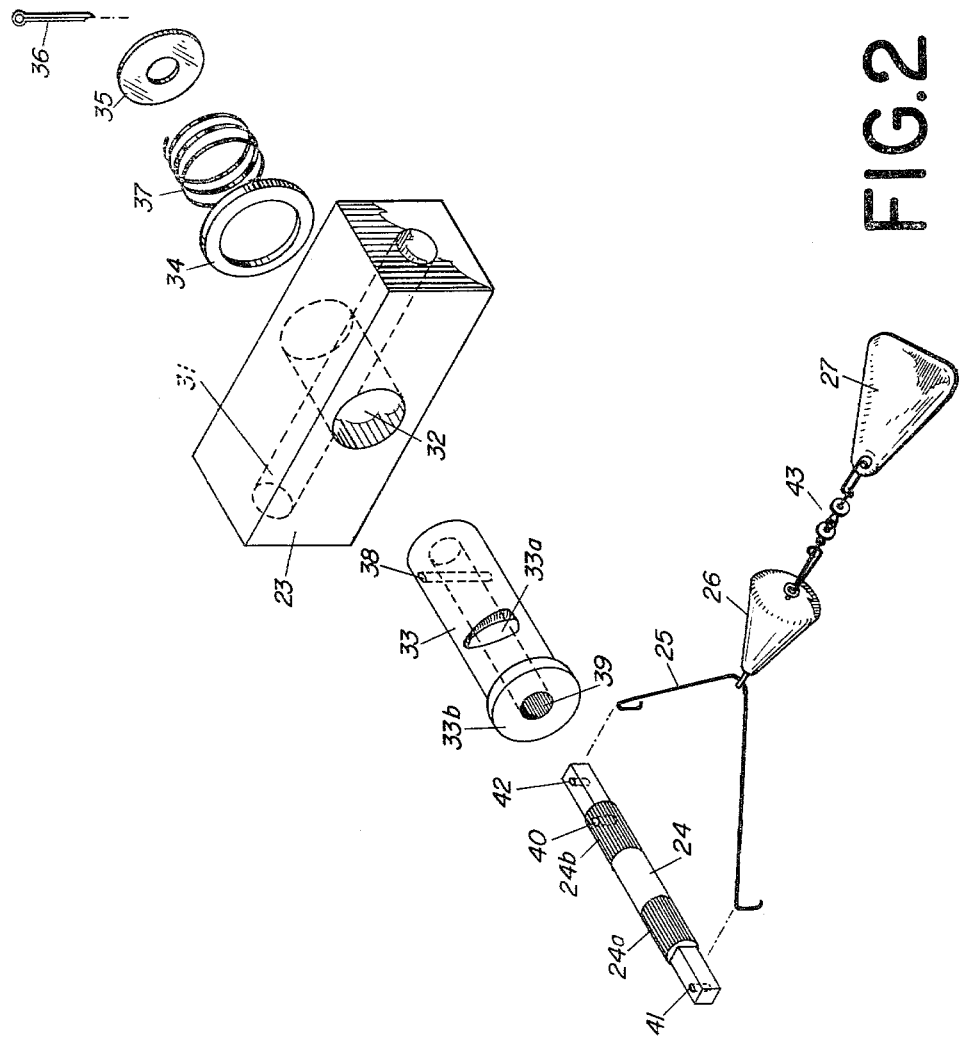

United States Patent Office 3,174,648
Patented Mar. 23, 1965

3,174,648
DEVICE FOR INDICATING AND CONTROLLING LEVELS OF VARIABLE BULK DENSITY SOLIDS MIXTURES
Ted R. Nelson, Lyons, N.Y., assignor to National Distillers and Chemical Corporation, New York, N.Y., a corporation of Virginia
Filed Nov. 1, 1962, Ser. No. 234,650
5 Claims. (Cl. 222—56)

The present invention relates to a device for indicating and controlling the level of a mixture of solid materials held in a storage and supply bin or hopper. More particularly the invention relates to such an indicator and control system as applied to means for supplying a mixture of pelletized resins to an extruder in combination with macerated scrap materials derived from the extruded product, wherein such mixture is supplied to the extruder from a hopper or storage bin. The invention relates especially to a device for sensing the level of materials in the hopper or bin, whereby to control the flow of at least one of the materials supplied thereto.

In the production of film webs of thermoplastic resinous materials, it is customary to feed the raw resins into the extruder by way of a hopper or subsidiary storage bin disposed above the extruder inlet. The feed to the extruder may consist of any predetermined proportions of pelletized virgin or reformed resins, and the macerated scrap, known as "fluff," derived from trimming the film web produced by the extruder. In a typical operation the feed material may be a preformed mixture of resin pellets of different densities, plus a portion of fluff to make up the required feed volume at any given rate of extrusion.

As a general rule, the fluff is supplied to the feed hopper at a constant rate, determined by the extrusion rate, while the feed of pelletized resin is adjusted to maintain the proper proportion of pellets to fluff. This proportional relationship is readily determined by maintaining a preset level of the mixture in the hopper. Measurement of this level, however, presents a difficulty. Conventional means such as float controls, gravity measuring devices, etc., are ineffective because of the diverse nature of the mixture, and the need for constant agitation thereof in the hopper, to avoid stratification, especially between the pellets and the fluff.

It is an object of the present invention to provide a solids level measurement means which will effectively measure the height of a column of variable density solids in a hopper or storage bin. It is a further object of the invention to provide such a measurement means as will determine the effective level of a mixture of solid materials while said solids are continuously stirred or agitated to avoid stratification of the mixture. A particular object of the invention is to provide level measurement means adapted for use as a control for the addition of at least one component of the mixture of materials being measured.

The invention and its objects may be more fully understood from the following description when it is read with reference to the accompanying drawings, in which FIGURE 1 is a view partly in vertical section through a hopper or bin from which a mixture of solids of different densities are supplied to a point of use; and FIGURE 2 is an exploded perspective view of the level gauging device.

In the drawings, and with particular reference to FIGURE 1, the numeral 1 designates a bin or hopper employed to contain a mixture 2 of pelletized resins and macerated film scrap or fluff. The hopper connects at its lower end with a conduit 3, adapted for connection as to an extruder (not shown). At its upper end, the hopper supports a spider 4, which in turn provides support for a hollow shaft 5, rotatable in the spider hub 4a, and a motor 6 for driving the shaft as through a gear train 7a.

The hollow shaft 5 is plugged at its lower end, and at its upper end is connected through a rotatable union 5a to an air conduit 7. The conduit 7 is connected in turn to a source of pressurized air as to the manifold 8 through branch conduit 8a. The conduit 7 also communicates with a motion balance controller device 9, which may be one such as manufactured by the Taylor Instrument Company, of Rochester, New York, and listed in their catalog 1B400 of February 1957, under the designation "Transcope Controller."

The controller device 9 is also connected to the source of pressurized air as by means of the manifold 8, and the branch line 8b. Air is supplied to the manifold 8 under constant pressure. The branch line 8a includes a constant flow meter device 10. Gauges 11 and 12 in the branch lines 8b and 8a serve to indicate the balance or unbalance of pressure therein.

A control valve 16, in the line 15 is actuated by the controller 9. In the pneumatic system shown, the valve 16 is a pneumatic control valve energized through a pneumatic system including the conduits 17 and 18. An electrically energized valve system may be employed if desired.

Mounted on the shaft 5 is an agitator or stirrer blade 20. This blade may be of any conventional type. As shown, it is formed of flat bar stock, and shaped generally to conform to the interior surfaces of the hopper 1. Its function is to provide effective mixing or stirring of the diverse solid materials fed to the hopper 1, by means of the conduit 13 and the conduit 15.

A level sensing and transmitter assembly is also mounted on the shaft 5. Preferably, the mount for this assembly is disposed radially at right angles to the stirrer blade. As shown, the assembly includes a pipe nipple 21 threaded in a passage opening into the hollow shaft 5, an elbow 22, in threaded connection between the nipple 21 and a valve body 23; a valve stem 24; bridle 25, secured in fixed rigid relation to the opposite ends of the stem 24; a weight 26, pivotally secured to the bridle; and a "spoon" 27, swivel mounted with relation to the weight 26. Other combinations for connecting the spoon to the valve stem may be employed, provided that such connections serve to translate movement of the spoon about an axis at right angles to the shaft 5, and in a plane parallel to said axis, into rotary movement of the valve stem, for the purpose later described.

The nature of the sensing and transmitter device is more clearly illustrated in FIGURE 2. The valve body 23, as shown, is cross drilled to form a conduit bore 31, threaded at one end to receive the elbow 22; and a valve bore 32 adapted to receive a valve plug 33. The bores 31 and 32 intersect, and the plug 33 provides a means for controlling flow through the bore 31. In the line of intersection, the plug 33 is provided with a grooved portion 33a disposed for registry with the bore 31, whereby as the valve plug may be rotated in bore 32, restriction of the bore 31 may be altered in varying degree, from fully open, to fully closed.

The valve plug 33 is of a length such that, when inserted in the bore 32, the lead end will extend outwardly beyond the body, with the plug head portion 33b, at the other end, engaging the body. The plug is held in place as by washers 34 and 35 and cotter pin 36, with an expansion spring 37 between the washers. A drilled passageway 38 in the plug is adapted to receive the cotter pin 36. Preferably the plug 33 is of a material such as nylon, or polytetrafluoroethylene, and is fitted to the bore 32 so as to turn with relative ease, without lubrication.

Rotation of the valve plug 33, through the operational range of rotation, is accomplished through the medium of the valve stem 24. The plug 33 is drilled longitudinally to provide a passage 39 adapted to receive the stem, the stem being of a length greater than the plug so as to protrude at either end thereof. Splined portions 24a and 24b at respective ends of the stem aid in positioning the stem in fixed non-rotational relation in the plug bore 39. In addition, the stem 24 is provided with a drilled passageway 40, adapted for registry with the plug passageway 38, whereby the cotter pin 36 may secure the stem and plug in fixed relation.

The valve stem 24 provides a mount for the bridle 25. In the assembly as illustrated by FIGURE 2, the bridle has a V shape. The ends of legs of the V are adapted to be received in passageways 41 and 42 in the respective ends of the stem 24, so as rigidly to engage the bridle with the stem. When the assembly is mounted as shown in FIGURE 1, the weight 26 secured to the bridle tends to bias the bridle and stem downwardly from a horizontal to a vertical position. Likewise in the operating conditions contemplated, and with the parts arranged for such purpose, the downward bias will increase the registration area of the valve plug portion 33a with the bore 31 as the weight moves downwardly.

The spoon 27 is attached to the weight 26 by means providing substantially a universal joint. In the device as shown, the means provided is a swivel, 43, of the type employed for attaching lures and/or hooks to the leaders of fishing tackle. As shown, the swivel 43 is attached to the weight 26 for substantially pivotal movement thereon.

In use, the hopper 1 is initially filled with pelletized solid resins. The stirrer 20, driven by the motor 6, maintains the mass "fluid" by agitation thereof. As the pelletized resins are drawn off through the conduit 3, additional quantities are added by way of the conduit 15.

In the operation contemplated, the resinous material from the conduit 3 is delivered to the inlet of an extruder, not shown, and under heat and pressure discharged as a web. The web is trimmed continuously as formed, and the trimmed material macerated to form the finely divided material known as "fluff." This trim material is then returned to the hopper by way of the conduit 13 at a constant rate, governed by the extrusion rate. In a typical operation, the amount of fluff depends upon the amount of material trimmed from the extruded web.

The combined amount of fluff and pelletized resins accumulated in the hopper 1 is predetermined to provide a set level of material therein. To maintain this level is the purpose of the transmitter assembly and controls previously set forth.

The control device 9 is a motion balance mechanism, wherein the pressure in the conduits 8a and 7 is balanced against the pressure in conduit 8b at a predetermined degree of pressure. Any change in this balance is utilized to control the flow of air through the conduits 17 and 18 to open or close the valve 16. In the system contemplated, the valve 16 may be one which is held open by an actuating spring, and closed by air pressure delivered through the conduit 18.

When set, the controller 9 is actuated by such movement of the valve plug 33 as may increase or decrease the registry of the portion 33a with the bore 31. With a pre-set pressure initially existing in the hollow shaft 5, and with the portion 33a substantially out of registry with the bore 11, any movement of the weight 26 downwardly will increase the registry of the portion 33a with bore 11, reducing pressure in the shaft 5 by releasing air into the hopper through the bore 31. This will upset the balance in the controller causing it to admit less air to the conduit 18, and thereby permitting the valve 16 to open under action of its actuating spring. Upward movement of the weight, of course, returning the valve plug to its closed position, will have an opposite effect. The weight 26 need only be heavy enough to overcome friction between the plug 33 and bore 32.

In the transmitter device shown, the position of the valve plug is regulated by the combined action of the weight 26 and the spoon 27. The spoon acts in much the same fashion as its fishing tackle counterpart, to support itself and the weight 26 on top of the contents of the hopper by being moved over the upper surface thereof by rotation of the shaft 5. In the operation described, rotation of the shaft at about 12 to 15 r.p.m. is sufficient to support the spoon on the upper surface of the material in the hopper.

With the level in the hopper established, and with the contents being withdrawn to the extruder at any given rate, fluff will be constantly returned to the hopper by way of conduit 13, and in substantially constant volume. Assuming flow of pelletized resins through the conduit 15 to have been cut off at the time the level in the hopper was established, discharge of the material through conduit 3 will cause the level to fall. The spoon 27, riding on the surface of the material 2 will also move downwardly, along with the weight 26. Such movement of the weight and spoon acts on the valve stem 24 and the valve plug 33 to increase registry of the portion 33a with the bore 31. Air flowing through the bore 31 reduces pressure in the shaft 5, and the conduits 7 and 8b, so as to unbalance the controller setting. Under the effect of such unbalance, the controller will reduce pressure in the line 18 and the spring actuated valve 16 will open to admit pelletized resins to the hopper, until such time as the level of the hopper contents is restored. As this level rises, the spoon and weight rise also, to restore the valve plug to its present condition, and pressure in the control system is again in balance.

As may be evident, the action of the valve plug 33 to establish balance in the controller 9 is a function of the level of solids in the hopper. With a constant flow of fluff through the conduit 13 determined by the rate of use of the hopper contents, the level of materials in the hopper is maintained by the addition of pelletized resin material to the hopper in a volume proportional to the volume of fluff. A typical proportion in the system described may be nineteen percent fluff to eighty-one percent pelletized resins.

The invention has been described specifically with reference to a system for supplying solid thermoplastic resins to an extruder for thermoplastic sheet material. As should be evident, the level sensing device described may be employed for determination of the level of any dispersion of solids or slurries, with or without antomatic means for controlling the addition of such materials to the container.

In addition, although for the purpose of illustrating and describing the invention a pneumatic system of indication and control is set forth, it should be evident that electrical or electronic means may be substituted. For example, the valve 23 may be replaced by a rheostat or "pot" transmitter in an electrical systtem, or by a strain gauge transducer mechanism in an electronic system. Also, although the weight and spoon combination is a single embodiment of the inventive concept, spring or flexible rod means may be employed to connect between the valve stem 24 and the spoon 27, and the basic advantages of the assembly be retained.

What is claimed is:

1. In an apparatus for means responsive to the level of a disperse mixture of solid materials in a container therefor including a shaft extending vertically into said container, the combination comprising a motion-sensitive element supported on said shaft to extend outwardly therefrom, said element including a rotatable second shaft extended therethrough to expose the ends; a substantially rigid bridle fixed to the ends of said second shaft and extending outwardly therefrom; a weight received at one end to said bridle; a weighted spoon swivel mounted on the other end of said weight; and means for rotating said vertically extending shaft, whereby said spoon is drawn over the upper surface of said disperse mixture of solids substantially supporting said weight.

2. The combination according to claim 1, wherein said motion-sensitive element is a conduit, including a cylindrical valve plug therein; and said rotatable shaft is a valve stem secured in fixed relation to said plug.

3. The combination according to claim 1, wherein said motion-sensitive element is a rheostat, and said rotatable shaft carries the conducting arm thereof.

4. An apparatus for maintaining a predetermined level of a disperse mixture of solid materials in a dispensing container therefor by the addition of controlled amounts of at least one component of said mixture as said mixture is dispensed, comprising a first conduit means adapted to deliver at least one component of said mixture to said hopper at a preset substantially constant rate and volume; a second conduit means, including a control valve adapted to regulate the volume of another component of said mixture delivered to said hopper by way of said second conduit; a rotatable shaft extended vertically into said hopper; a motion-sensitive means carried on said shaft in substantially right angular relation thereto, said motion-sensitive means including a horizontal shaft extended through said means to expose the ends of said shaft; a bridle fixed to the ends of said shaft, and having a trailing end; a weight secured at one end to said bridle trailing end, said weight adapted to rotate said shaft when unsupported; a support for said weight swivel-mounted at the other end thereof including a spoon adapted to ride on the upper surface of said disperse mixture when drawn thereover by rotation; means for rotating said vertical shaft; and means for actuating said valve to control volumetric flow through said second conduit energized by said sensing means.

5. A measuring apparatus for measuring the level of a mass of particles within a container comprising a shaft extending vertically into said container, a transducer means mounted on said shaft, a substantially rigid member having one end thereof connected to said transducer, and a weight pivotally mounted to the other end of said member; and means for rotating said vertically extending shaft, whereby said weight is drawn over the upper surface of said mass of particles; said member assuming an angular position determined substantially by the average level of said massive particles.

References Cited in the file of this patent

UNITED STATES PATENTS 2,277,879   Ness et al _____ Mar. 31, 1942

FOREIGN PATENTS 510,312   Belgium _____ Apr. 15, 1952